United States Patent
Drost

(10) Patent No.: US 9,604,850 B2
(45) Date of Patent: Mar. 28, 2017

(54) AMMONIA BORANE PURIFICATION METHOD

(71) Applicant: WeylChem Sustainable Materials, LLC, Elgin, SC (US)

(72) Inventor: Kevin Joel Drost, Lugoff, SC (US)

(73) Assignee: WeylChem Sustainable Materials, LLC, Elgin, SC (US)

( * ) Notice: Subject to any disclaimer, the term of this patent is extended or adjusted under 35 U.S.C. 154(b) by 0 days.

(21) Appl. No.: 14/576,296

(22) Filed: Dec. 19, 2014

(65) Prior Publication Data

US 2015/0183646 A1    Jul. 2, 2015

Related U.S. Application Data

(60) Provisional application No. 61/921,182, filed on Dec. 27, 2013.

(51) Int. Cl.
C01B 35/14    (2006.01)

(52) U.S. Cl.
CPC ........ C01B 35/146 (2013.01); *C01P 2006/80* (2013.01)

(58) Field of Classification Search
CPC .......................... C01P 2006/80; C01B 35/146
See application file for complete search history.

(56) References Cited

U.S. PATENT DOCUMENTS

| | | | |
|---|---|---|---|
| 3,313,603 A | 4/1967 | Hough et al. | |
| 3,882,037 A | 5/1975 | Brown | |
| 4,801,439 A | 1/1989 | Blum et al. | |
| 5,808,070 A | 9/1998 | Noth et al. | |
| 6,060,623 A * | 5/2000 | Iwasaki | C07F 5/022 564/8 |
| 6,586,563 B1 | 7/2003 | Ortega et al. | |
| 7,695,704 B2 | 4/2010 | Wolf et al. | |
| 7,897,129 B2 | 3/2011 | Autrey et al. | |
| 8,038,980 B2 | 10/2011 | Yang et al. | |

(Continued)

FOREIGN PATENT DOCUMENTS

JP    2012-001419    5/2012

OTHER PUBLICATIONS

Bakus et al. "Boron—Nitrogen Compounds" Encyclopedia of Inorganic and Bioinorganic Chemistry [Online] 2011.

(Continued)

*Primary Examiner* — Stanley Silverman
*Assistant Examiner* — Syed Iqbal
(74) *Attorney, Agent, or Firm* — Timothy J. Monahan; Monahan & Company, LLC

(57) ABSTRACT

A method of purifying ammonia borane is provided in which crude ammonia borane is dissolved in an organic solvent, such as an ether, and mixed with a basic aqueous solution to form a two-phase system. The pH of the aqueous solution and the temperature are adjusted to increase the solubility of the impurities and decrease the solubility of the ammonia borane in the basic aqueous solution, without causing decomposition of the ammonia borane. The impurities are separated from the crude ammonia borane solution, the mixture is phase-separated and the dissolved ammonia borane is isolated from the organic solvent fraction. High purity ammonia borane is obtained.

22 Claims, 1 Drawing Sheet

(56) References Cited

U.S. PATENT DOCUMENTS

| | | | |
|---|---|---|---|
| 2007/0243122 A1* | 10/2007 | Ramachandran | C01B 3/02 423/285 |
| 2008/0159949 A1 | 7/2008 | Mohajeri et al. | |
| 2008/0175781 A1 | 7/2008 | Thorn et al. | |
| 2009/0104102 A1 | 4/2009 | Shore et al. | |
| 2009/0291039 A1 | 11/2009 | Autrey et al. | |
| 2010/0230636 A1 | 9/2010 | Hsueh et al. | |
| 2010/0272623 A1 | 10/2010 | Lukacs et al. | |
| 2010/0329974 A1 | 12/2010 | Chen et al. | |
| 2011/0064640 A1 | 3/2011 | Kaye et al. | |
| 2011/0104046 A1 | 5/2011 | Abdur-Rashid et al. | |
| 2011/0158881 A1 | 6/2011 | Chen et al. | |
| 2012/0014857 A1 | 1/2012 | Shore et al. | |
| 2012/0301382 A1 | 11/2012 | Balema et al. | |
| 2013/0121905 A1 | 5/2013 | Goudon et al. | |
| 2013/0225863 A1 | 8/2013 | Ramachandran et al. | |
| 2014/0186252 A1 | 7/2014 | Spielvogel et al. | |

OTHER PUBLICATIONS

Bluhm et al. "Amineborane-Based Chemical Hydrogen Storage: Enhanced Ammonia Borane Dehydrogenation in Ionic Liquids" Journal of the American Chemical Society [Online] 2006, 128, pp. 7748-7749.

Denney et al. "Efficient Catalysis of Ammonia Borane Dehydrogenation" Journal of the American Chemical Society [Online] 2006, 128, pp. 12048-12049.

Heldebrant et al. "Synthesis of Ammonia Borane for Hydrogen Storage Applications" Energy & Environmental Science [Online] 2008, 1, pp. 156-160.

Hu et al. "New Synthetic Approaches to Ammonia-Borane and Its Deuterated Derivatives" Journal of Inorganic and Nuclear Chemistry [Online] 1977, 39, pp. 2147-2150.

Jaska et al. "Transition Metal-Catalyzed Formation of Boron-Nitrogen Bonds: Catalytic Dehydrocoupling of Amine-Borane Adducts to Form Aminoboranes and Borazines" Journal of the American Chemical Society [Online] 2003, 125, pp. 9424-9434.

Karkamkar et al. "Recent Developments on Hydrogen Release from Ammonia Borane" Material Matters [Online] 2007, 2, pp. 1-9.

Parry et al. "Annual Report: The Chemistry of Boron Hydrides and Related Hydrides WADC Technical Report 57-11" Engineering Research Institute, The University of Michigan Ann Arbor [Online] 1957, pp. 1-32.

Ramachandram et al. "Preparation of Ammonia Borane in High Yield and Purity, Methanolysis, and Regeneration" Inorganic Chemistry [Online] 2007, 46, pp. 7810-7817.

Sanyal et al. "Hydrolysis of Ammonia Borane as a Hydrogen Source: Fundamental Issues and Potential Solutions Towards Implementation" ChemSusChem [Online] 2011, 4, pp. 1731-1739.

Shore et al. "Chemical Evidence for the Structure of the Diammoniate of Diborane. II. The Preparation of Ammonia-Borane" Journal of the American Chemical Society [Online] 1958, 80, pp. 8-12.

Shore et al. "The Crystalline Compound Ammonia-Borane, H3NBH3" Journal of the American Chemical Society [Online] 1955, 77, pp. 6084-6085.

Stephens et al. "Acid Initiation of Ammonia-Borane Dehydrogenation for Hydrogen Storage" Angewandte Chemie International Edition [Online] 2007, 46, pp. 746-749.

Patent Cooperative Treaty, International Search Report, May 2, 2014.

Moury, et al., "Hydrazine Borane: synthesis, characterization and applications", Phys. Chem. Chem. Phys., Dec. 14, 2011, vol. 14 pp. 1768-1777.

Patent Cooperative Treaty, International Search Report, Mar. 19, 2015.

* cited by examiner

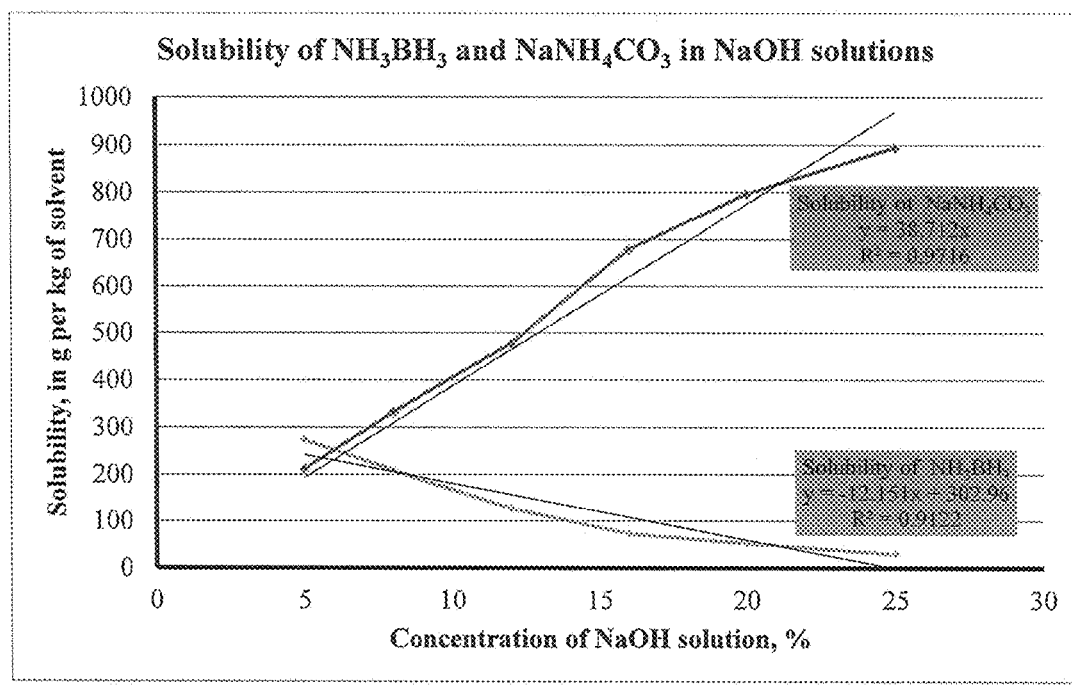

AMMONIA BORANE PURIFICATION METHOD

This invention is directed to a method of purifying ammonia borane, which includes the steps of forming a mixture of (a) a solution of crude ammonia borane in an organic solvent and (b) a basic aqueous solution, at conditions under which impurities present in the crude ammonia borane, such as sodium ammonium carbonate, are substantially more soluble in the aqueous solution than is the ammonia borane. After the impurities are extracted or caused to precipitate from the organic solvent, the organic solvent containing ammonia borane is phase separated from the basic aqueous solution Ammonia borane having a purity of 99% or greater can be recovered from the organic solvent layer.

BACKGROUND OF THE INVENTION

Ammonia borane, also referred to as ammonium borane and borazane, has been investigated as an energy-dense source of hydrogen, for example, for use in hydrogen related power generation. Methods of synthesis of ammonia borane are disclosed in Ramachandran et al. US 2007/0243122 A1 ("Ramachandran"). Briefly, the process involves reacting a metal borohydride with an ammonia salt, in a suitable solvent. For example, sodium borohydride is reacted with ammonium carbonate in an ether solvent, such as tetrahydrofuran ("THF") or dioxane. Following the reaction to form ammonia borane, the solution is filtered and the solvent is removed under vacuum to yield solid ammonia borane. The recovered ammonia borane powder may be purified by extraction with a suitable solvent, followed by removal of the solvent under reduced pressure, to yield a solid ammonia borane of relatively high purity.

A shortcoming of prior art ammonia borane purification methods is that many of the impurities present in the crude ammonia borane are also soluble in the solvent used to extract the ammonia borane. Consequently, when the solvent is evaporated from the ammonia borane solution, such impurities remain in the recovered product. Thus, despite the methods disclosed by Ramachandran and others, a need remains for an ammonia borane purification method that is economical to operate commercially and yields high-purity ammonia borane.

It can be understood that metal ammonium salts, such as sodium ammonium carbonate, are a significant byproduct of the synthesis reaction between a metal borohydride and an ammonia salt. Isolating ammonia borane from metal ammonium salts and other byproducts of the reaction has proven difficult in the past, due to the difficulty of filtering byproducts that have precipitated in the reaction slurry and due to the similar solubilities of ammonia borane and the byproducts in a range of polar and non-polar solvents. The utility of ammonia borane as a hydrogen storage medium is linked to its ability to release $H_2$ over a wide range conditions, including in the presence of ionic liquids and bases. Accordingly, purification of crude ammonia borane is limited to conditions that do not trigger decomposition of the ammonia borane and $H_2$ release.

SUMMARY OF THE INVENTION

An object of the invention is to provide high-purity ammonia borane, for example, ammonia borane having a purity of 99% or higher, by weight. Another object of the invention is to provide an ammonia borane purification method, whereby crude ammonia borane is treated to remove impurities, while the ammonia borane is dissolved in an organic solvent. Yet another object of the invention is to provide a purification method that may be used with a solution of crude ammonia borane in the organic ether in which the ammonia borane is synthesized. Still another object of the invention is to employ a basic aqueous solution to extract, digest and or precipitate impurities present in crude ammonia borane, at conditions under which the solubility of ammonia borane in the aqueous solution is minimal. Another object of the invention is to provide a method of ammonia borane purification that is economical to operate commercially and can be adapted to either a batch or continuous process. The foregoing objectives are met by one or more of the following embodiments of the present invention.

The process may be employed to purify crude ammonia borane produced by any of a variety of synthetic processes. The crude ammonia borane may be in the form of an isolated solid, such as a dry powder or a wet filter cake, or the crude ammonia borane may be suspended in a suitable organic liquor. Ammonia borane can be synthesized in an organic ether, with the resulting crude ammonia borane dissolved therein. The crude ammonia borane solution can be advantageously used directly in the present purification process, without the need to first isolate the ammonia borane from the organic solvent. Regardless of the synthetic method used to produce the crude ammonia borane or its physical state, the crude ammonia borane can be dissolved in a suitable organic solvent and purified according to the method herein.

The purification process is conducted with the crude ammonia borane dissolved in an organic solvent, such as an organic ether, referred to herein as the crude ammonia borane solution. The solution contains impurities, including byproducts from the synthesis of ammonia borane. The byproducts are typically metal ammonium salts, produced by the reaction of a metal borohydride and an ammonia salt in an organic ether, such as sodium ammonium carbonate, as well as unreacted starting material, dimers, trimers, and other self-condensation products, and other borates. The impurities exhibit a wide range of solubilities in the organic solvent, that is, a particular impurity may be insoluble, partially soluble or soluble in the organic solvent.

The crude ammonia borane solution is mixed with a basic aqueous solution, to form a two-phase system. The basic aqueous solution may be an alkali metal hydroxide or an alkaline earth metal hydroxide. The pH may range from 8 to 14.

The crude ammonia borane solution and the basic aqueous solution are mixed at conditions under which the impurities present in the organic solvent are separated by partitioning into the basic aqueous solvent or precipitating from the mixture. Another feature of the process is that some of the impurities can be decomposed by or react with the basic aqueous solvent and such reactants can also be extracted by the basic aqueous solvent, evolve as a gas or precipitate. Thus, the step of separating the impurities from the organic solvent is intended to include the impurities present in the crude ammonia borane solution, as well as any decomposition products or reactants derived from the impurities that are extracted into the basic aqueous solution, precipitated from or evolved from the mixture.

The pH of the basic aqueous solvent, for example the concentration of the hydroxide, the volume of the basic aqueous solvent and the temperature at which the mixing and separation step is conducted are selected to increase the solubility of the impurities in the basic aqueous solvent, especially the metal ammonium salts, and decrease the solubility of ammonia borane in the basic aqueous solution. By following the teachings herein, it is possible to separate the metal ammonium salts present in the crude ammonia borane solution at conditions under which the metal ammonium salts are at least two times, four times or even eight times more soluble in the basic aqueous solvent than the ammonia borane is soluble in the basic aqueous solution during the mixing step.

The mixing and separation step may be effectively conducted at temperatures ranging from 20 to 50° C. By way of example, the objectives of the invention have been achieved when the mixing and separation step is conducted for 10 minutes or more.

In the next steps of the process, the mixture is allowed to phase separate and the organic solvent phase containing dissolved ammonia borane is separated from the basic aqueous solvent and precipitates. The ammonia borane may then be isolated from the organic solvent, by conventional methods. Ammonia borane having a purity of 99 weight % or greater may be obtained.

BRIEF DESCRIPTION OF THE DRAWINGS

FIG. 1 is a chart of the solubility of ammonia borane and sodium ammonium carbonate versus the concentration of sodium hydroxide in solution, at 25° C.

DETAILED DESCRIPTION OF THE INVENTION

Without limiting the scope of the invention, the preferred embodiments and features are hereinafter set forth. All of the United States patents and published applications, which are cited in the specification, are hereby incorporated by reference. Unless otherwise indicated, conditions are 25° C., 1 atmosphere of pressure and 50% relative humidity and concentrations are by weight. Unless otherwise indicated, the relative solubilities of byproducts, such as the metal ammonium salts, and ammonia borane in the basic aqueous solvent are determined separately, that is, the solubility of each in the basic aqueous solvent is measured without the presence of the other. Unless otherwise indicated, the solubility in the basic aqueous solvent reported for the byproducts or ammonia borane is determined separately.

Synthesis of Crude Ammonia Borane

The crude ammonia borane that is purified according to the method of the present invention may be obtained from a variety of sources. For example, a metal borohydride may be reacted with an ammonia salt in an organic ether, such a tetrahydrofuran ("THF") or dioxane. Processes for synthesizing ammonia borane are disclosed in the following references: Ramachandran et al. U.S. 2007/0243122 A1; Autrey et al. U.S. Pat. No. 7,897,129 B2; Yang et al. U.S. Pat. No. 8,038,980 B2; Shore et al. U.S. 2009/0104102 A1; Lukacs et al. U.S. 2010/0272623 A1; Kaye et al. U.S. 2011/0064640 A1; and Kikukawa Yasuo JP 2012-001419 A.

By way of example, the metal borohydride may be selected from lithium borohydride and sodium borohydride, and the ammonia salt may be selected from ammonium sulfate, ammonium chloride, ammonium fluoride, ammonium carbonate, ammonium nitrate, ammonium acetate, or ammonium formate. The reaction is conducted in an organic solvent in which ammonia borane is soluble, such as an organic ether. Suitable organic ethers include THF, 2-methyltetrahydrofuran, diethylether and dioxane. In one process for synthesizing ammonia borane, sodium borohydride and ammonium carbonate react in THF to form ammonia borane.

The synthesis reaction is represented by the equation below:

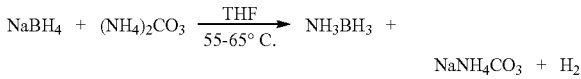

$$NaBH_4 + (NH_4)_2CO_3 \xrightarrow[55\text{-}65°\text{ C.}]{THF} NH_3BH_3 + NaNH_4CO_3 + H_2$$

The crude ammonia borane may be in the form of a solution in an organic solvent, such as an organic ether. For example, after the synthesis reaction is complete, the mixture may be filtered to remove insoluble by-products. The crude ammonia borane remains dissolved in the organic solvent in which the synthesis was conducted. Thus, it is not necessary to isolate the ammonia borane from the solvent in which it was synthesized, prior to practicing the purification process of the present invention.

The crude ammonia borane may be in the form of isolated solids. For example, after the synthesis reaction is complete, the mixture is filtered to remove insoluble by-products, followed by evaporation of the organic solvent from the filtrate, for example, by stripping the solvent under vacuum. After the solvent is removed, crude ammonia borane in solid faun is recovered. The crude ammonia borane may be dissolved in an organic solvent, to practice the present purification process.

The crude ammonia borane may be in the form of a suspension or slurry in an organic liquor. For example, after the synthesis of ammonia borane in the presence of an organic ether, most of the organic ether is stripped off and an organic liquor is added to the vessel. The organic liquor has the properties of being water immiscible and the ammonia borane is insoluble therein. Furthermore, the organic liquor is selected to have a boiling point higher than the organic ether solvent and facilitates stripping the remaining organic ether solvent from the liquor. Then, any remaining organic ether solvent is removed from the vessel, and the crude ammonia precipitates as a suspension or slurry in the organic liquid. Examples of suitable organic liquors include pentane, hexane and heptane, in particular, the straight chain (n-) isomers thereof. The crude ammonia borane can then be dissolved in an organic solvent, to practice the present purification process. It also within the scope of the present invention for the organic liquor to be present, when the crude ammonia borane solution is mixed with the basic aqueous solvent.

Purification of Crude Ammonia Borane

Crude ammonia borane, for example, ammonia borane having a purity of less than 99%, may be purified according to the following methods. The crude ammonia borane may be obtained from the above described methods of synthesis and dissolved in an organic solvent. The impurities in the crude ammonia borane may be insoluble, partially soluble, soluble, immiscible, partially miscible, or miscible in the crude ammonia borane solution.

The crude ammonia borane solution is mixed with a basic aqueous solvent. The basic aqueous solvent and the organic solvent form a two-phase system, although minor amounts, for example 10% by weight or less, of the organic solvent may be soluble in the basic aqueous solvent, especially when the system is heated. By way of example, the pH of the basic aqueous solution that is mixed with the crude ammonia borane solution is from 8 to 14, in particular, from 8 to 13.

Suitable basic aqueous solvents include solutions of inorganic hydroxides, such as alkali metal hydroxides and alkaline earth metal hydroxides, including sodium hydroxide, potassium hydroxide, lithium hydroxide, magnesium hydroxide and calcium hydroxide.

The crude ammonia borane solution and the basic aqueous solution are mixed at conditions under which the byproducts, and such other impurities as may be present in the organic solvent, are separated by partitioning into the basic aqueous solvent, precipitating from or evolving from the mixture. The pH of the basic aqueous solvent, for example the concentration of the hydroxide, the volume of the basic aqueous solvent and the temperature at which the mixing and separation step is conducted are selected to increase the solubility of the impurities in the basic aqueous solvent, especially the metal ammonium salts, and decrease the solubility of ammonia borane in the basic aqueous solution.

Metal ammonium salts, for example sodium ammonium carbonate, are byproducts of the reaction to synthesize ammonia borane from a metal borohydride and an ammonium salt. It has been found that the relative solubility of the metal ammonium salts and ammonia borane in the basic aqueous solvent varies significantly as the concentration of hydroxides varies in the basic aqueous solvent. Referring to FIG. 1, the solubility of ammonia borane and the solubility of sodium ammonium carbonate are plotted against the concentration of sodium hydroxide in solution, at 25° C. At about 5 weight % NaOH in solution, the solubility of ammonia borane and sodium ammonium carbonate are similar. As the concentration of NaOH increases, however, the solubility of ammonia borane decreases and the solubility of sodium ammonium carbonate increases dramatically. By way of example, an aqueous solution of 15 to 20 weight % of sodium hydroxide has been shown to provide a significant difference between the solubility of ammonia borane and the metal ammonium salt byproduct.

It can be understood that by adjusting the pH of the basic aqueous liquor, for example, by varying the concentration of the inorganic hydroxide, it is possible to extract the metal borohydride salt byproducts present in the crude ammonia borane solution at conditions under which the byproducts are at least two times, four times or even eight times more soluble in the basic aqueous solvent than the ammonia borane is soluble in the basic aqueous solution.

An important aspect of the present invention is to remove the impurities present in the crude ammonia borane solution, while minimizing the loss of ammonia borane, for example by ammonia borane partitioning into the basic aqueous phase or decomposing. The loss of ammonia borane can be minimized by adjusting the pH of the basic aqueous solution and the temperature of the mixing and separation step to limit the solubility of the ammonia borane in the basic aqueous solution to 200 g/kg or less, 150 g/kg or less, or even 100 g/kg or less, based on ammonia borane in the basic aqueous solvents, as determined without the byproducts and organic solvent present in the system.

The loss of ammonia borane can also be reduced by limiting the quantity of the basic aqueous solvent mixed with the crude ammonia borane solution to the minimum amount necessary to solubilize the metal ammonium salts. By operating at conditions whereby the basic aqueous solvent is saturated or near saturated, for example, at least 75% saturated or even at least 90% saturated, with the metal ammonium salt, the amount of ammonia borane that is soluble in the basic aqueous solvent is decreased, relative to the solubility of ammonia borane in the absence of the metal ammonium salt. The volume of the basic aqueous solvent necessary to extract the metal ammonium salt at saturation or near saturation levels can be determined by analyzing the concentration of the metal ammonium salt in the crude ammonia borane solution to be purified. By way of example, the ratio of the volume of the basic aqueous solution to the volume of the crude ammonia borane solution may range from 1:1 to 1:10, in particular from 1:3 to 1:7, respectively.

The mixing and separation step may be effectively conducted at temperatures ranging from 20 to 50° C., in particular from 25 to 45° C., more particularly from 30 to 40° C. A feature of the present method is that during the mixing step certain of the impurities present in the crude ammonia borane solution are decomposed by or react with the basic aqueous solvent and such reactants can also be extracted by the basic aqueous solvent, evolve as a gas or precipitate. The rate of reaction and/or decomposition of the impurities is promoted by increasing the temperature of the mixing step, although diminishing returns are observed above 50° C. Additionally, care must be exercised to avoid decomposing the ammonia borane, which becomes unstable in a basic aqueous environment at increased temperatures. During the mixing and separating step, the mixture of the crude ammonia borane solution and the basic aqueous solvent may be agitated for 10 minutes or more, in particular from 10 to 60 minutes.

In the next steps of the process, agitation of the mixture is stopped and the mixture is allowed to phase separate. The organic solvent phase containing ammonia borane dissolved in the organic solvent is separated from the basic aqueous solvent and precipitates present in the aqueous layer and sediment. The organic solvent may be filtered to remove minor amounts of insoluble impurities suspended therein. The organic solvent may then be removed from the ammonia borane solution by stripping the solvent under reduced pressure, for example, under vacuum at from 45 to 50° C. When most of the solvent has been removed, for example 90 to 95%, an organic liquor, in which the ammonia borane is insoluble, is added to the remaining organic solvent and ammonia borane. The organic liquor facilitates stripping the remaining organic solvent from the liquor, leaving the purified ammonia borane in suspension in the organic liquor. Examples of suitable organic liquors include pentane, hexane and heptane, in particular, the straight chain (n-) isomers thereof. The ammonia borane suspension is then filtered and the ammonia borane dried. Other methods to isolate the ammonia borane recovered in the organic solvent phase of the mixture include spray drying and crystallization of ammonia borane after being concentrated in the organic solvent.

The method of the present invention may be conducted as a batch process or a continuous process.

By following the teaching herein, it is possible to remove at least 50 weight %, at least 75 weight % or even at least 90 weight % of the byproducts from the crude ammonia borane solution. Ammonia borane having a purity of 99 weight % or greater may be obtained.

EXAMPLE 1

Synthesis of Crude Ammonia Borane and Purification 1000 g of virgin THF ($K_f \leq 0.1\%$) was charged to a pot and cooled to <10° C. To the pot was then charged sodium borohydride (31.0 gm, 0.819 mol) and the mixture was warmed to 30-35° C. During heating, the mantle temperature was not allowed to rise above 35° C. Once the pot was in the temperature range, the ammonium carbonate (78 gm, 0.811 mol) was added over a 1 hour period, and off-gassing of hydrogen was observed. Once all of the ammonium carbonate was added, the pot was warmed to 58-60° C. over 1 hour. A flow of nitrogen was used during the reaction, to dilute the hydrogen that evolved. Once the pot temperature reached 58-60° C., the mixture was digested for 4 hours. Following the 4 hour digest, the pot was cooled to 25-30° C. At this time, the resulting crude ammonia borane solution, including dissolved and un-dissolved byproducts (primarily sodium ammonium carbonate) was mixed with an 18.5% NaOH aqueous caustic solution (220-230 gm). The pot was allowed to warm to 30-35 during the addition. Once the caustic was in the pot, the agitation was slowed for 10 minutes and then stopped to allow the bottom aqueous layer to settle out. The bottom layer (260-270 gm) was removed and the top layer was filtered at 25-35° C. to remove small amounts of insoluble. The resulting clear solution was stripped at 45-50° C. with vacuum. The strip was continued until 90-95% of organic weight was removed (850-950 gm). At this point, the vacuum was broken with nitrogen and to the pot was added heptane (150-200 gm). The pot was restriped to remove the remainder of the THF. Once the remainder of the THF was removed, the pot was cooled to room temperature and the desire product was filtered. The resulting wet cake was dried at room temperature with vacuum to yield a white solid (17-18 grams). The yield was 68-72%. NMR analysis of this product showed >99.2% purity.

Applications of Ammonia Borane

The high-purity ammonia borane made according to the present invention has application as a storage medium for hydrogen in vehicles containing fuel cells, as well as for any other applications where reagent grade ammonia borane may be advantageously employed. Examples of applications for ammonia borane may be found in the following references: Mohajeri et al. U.S. 2008/0159949 A1; Hsueh et al. 2010/0230636 A1; Chen et al. U.S. 2010/0329974 A1; Abdur-Rashid et al. U.S. 2011/0104046 A1; Chen et al. US 2011/0158881 A1; and Balema et al. WO 2011/02303.

The invention may be further understood by reference to the following claims.

What I claim is:

1. A method of purifying crude ammonia borane, comprising the steps of:
   (a) providing a crude ammonia borane solution, comprising ammonia borane dissolved in an organic solvent and impurities comprising byproducts generated from the synthesis of the ammonia borane;
   (b) providing a basic aqueous solution;
   (c) mixing the crude ammonia borane solution and the basic aqueous solution, wherein the organic solvent and the basic aqueous solution form a two-phase system, and wherein the mixing is conducted at conditions under which the impurities are more soluble in the basic aqueous solution than the ammonia borane, and at least some of the impurities are separated from the organic solvent by partitioning into the basic aqueous solution, degrading or precipitating;
   (d) allowing the phases to partition into an organic solvent phase containing ammonia borane dissolved therein and a basic aqueous solution phase;
   (e) separating the organic solvent phase from the basic aqueous solution phase; and
   (f) isolating the ammonia borane in the organic solvent phase from the organic solvent.

2. The method of claim 1, wherein the basic aqueous solution has a pH of from 8to 13.5.

3. The method of claim 2, wherein the basic aqueous solution comprises an inorganic hydroxide selected from the group consisting of alkali metal hydroxides and alkaline earth metal hydroxides.

4. The method of claim 3, wherein the organic solvent is an ether and the byproducts comprise sodium ammonium carbonate, and the solubility of sodium ammonium carbonate in the basic aqueous solution is at least four times greater than the solubility of ammonia borane in the basic aqueous solution at 25° C.

5. The method of claim 4, wherein the mixing step is conducted at a temperature of from 20 to 50° C. for at least 10 minutes, and at least 50 weight % of the impurities are separated from the crude ammonia borane solution.

6. The method of claim 1, wherein the byproducts comprise metal ammonium salt, and the solubility of the metal ammonium salt in the basic aqueous solution is at least two times greater than the solubility of ammonia borane in the basic aqueous solution at 25° C.

7. The method of claim 1, wherein the byproducts comprise a metal ammonium salt, and the solubility of the metal ammonium salt in the basic aqueous solution is at least four times greater than the solubility of ammonia borane in the basic aqueous solution at 25° C.

8. The method of claim 1, wherein the byproducts comprise a metal ammonium salt, and the solubility of the metal ammonium salt in the basic aqueous solution is at least eight times greater than the solubility of ammonia borane in the basic aqueous solution at 25° C.

9. The method of claim 8, wherein the basic aqueous solution comprises a concentration of from 15 to 20 weight % of sodium hydroxide.

10. The method of claim 8, wherein organic solvent is an ether and the solubility of ammonia borane in the basic aqueous solution is 200 g per kg or less at 25° C.

11. The method of claim 1, wherein the ratio of the volume of the basic aqueous solution to the volume of the crude ammonia borane solution is from 1:1 to 1:10.

12. A method of purifying crude ammonia borane, comprising the steps of:
   (a) providing a crude ammonia borane solution, comprising ammonia borane dissolved in an organic solvent and byproducts, wherein the byproducts are generated from the synthesis of ammonia borane by the reaction of a metal borohydride and an ammonia salt in an organic ether;
   (b) providing a basic aqueous solution;
   (c) mixing the crude ammonia borane solution and the basic aqueous solution, wherein the organic solvent and the basic aqueous solution form a two-phase system, and wherein the mixing is conducted at conditions under which the byproducts are more soluble in the basic aqueous solution than the ammonia borane, and at least 50 weight % of the byproducts are separated from the organic solvent by partitioning into the basic aqueous solution, degrading or precipitating;
   (d) allowing the phases to partition into an organic solvent phase containing ammonia borane dissolved therein and a basic aqueous solution phase;
   (e) separating the organic solvent phase from the basic aqueous solution phase; and
   (f) isolating the ammonia borane in the organic solvent phase from the organic solvent.

13. The method of claim 12, wherein the basic aqueous solution comprises an inorganic hydroxide selected from the group consisting of alkali metal hydroxides and alkaline earth metal hydroxides.

14. The method of claim 13, wherein the organic solvent is an ether selected from the group consisting of tetrahydrofuran, 2-methyltetrahydrofuran, diethylether and dioxane.

15. The method of claim 12, wherein the byproducts comprise a metal ammonium salt and wherein the mixing step is conducted at conditions under which the solubility of the metal ammonium salt in the basic aqueous solution is at least four times greater than the solubility of ammonia borane in the basic aqueous solution.

16. The method of claim 15, wherein the solubility of ammonia borane in the basic aqueous solution is 150 g/kg or less at 25° C.

17. The method of claim 12, wherein the ratio of the volume of the basic aqueous solution to the volume of the crude ammonia borane solution is from 1:3 to 1:7.

18. A method of purifying crude ammonia borane, comprising the steps of:
   (a) providing a crude ammonia borane solution, comprising ammonia borane dissolved in an organic ether and byproducts, wherein the byproducts comprise metal ammonium salts generated from the synthesis of ammonia borane;
   (b) providing a basic aqueous solution;
   (c) mixing the crude ammonia borane solution and the basic aqueous solution, wherein the organic ether and the basic aqueous solution form a two-phase system, and wherein the mixing is conducted at conditions under which the metal ammonium salts are more soluble in the basic aqueous solution than the ammonia borane, and at least 50 weight % of the metal ammonium salts are separated from the organic ether by partitioning into the basic aqueous solution;
   (d) allowing the phases to partition into an organic ether phase containing ammonia borane dissolved therein and a basic aqueous solution phase;
   (e) separating the organic ether phase from the basic aqueous solution phase; and
   (f) isolating the ammonia borane in the organic ether phase from the organic ether, wherein the ammonia borane has a purity of 99 weight % or greater.

19. The method of claim 18, wherein the basic aqueous solution comprises an inorganic hydroxide selected from sodium hydroxide and potassium hydroxide, and wherein the organic ether is selected from the group consisting of tetrahydrofuran, 2-methyltetrahydrofuran, diethylether and dioxane.

20. The method of claim 18, wherein the metal ammonium hydroxide is sodium ammonium carbonate, and wherein the mixing step is conducted at conditions under which the solubility of the sodium ammonium carbonate in the basic aqueous solution is at least four times greater than the solubility of ammonia borane in the basic aqueous solution.

21. The method of claim 18, wherein the solubility of ammonia borane in the basic aqueous solution is 100 g per kg or less at 25° C., and the solubility of the metal ammonium salt in the basic aqueous solution is at least eight times greater than the solubility of ammonia borane in the basic aqueous solution at 25° C.

22. The method of claim 21, wherein the basic aqueous solution comprises a concentration of from 15 to 20 weight % of sodium hydroxide.

* * * * *